United States Patent
Tanabe et al.

(10) Patent No.: US 9,051,398 B2
(45) Date of Patent: Jun. 9, 2015

(54) METHOD FOR PRODUCING (METH)ACRYLATE COPOLYMER

(71) Applicant: KURARAY CO., LTD., Kurashiki-shi (JP)

(72) Inventors: Hirofumi Tanabe, Tsukuba (JP); Seiya Shimizu, Tsukuba (JP); Kazuhiko Maekawa, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/385,348

(22) PCT Filed: Mar. 13, 2013

(86) PCT No.: PCT/JP2013/056958
§ 371 (c)(1),
(2) Date: Sep. 15, 2014

(87) PCT Pub. No.: WO2013/141105
PCT Pub. Date: Sep. 26, 2013

(65) Prior Publication Data
US 2015/0038658 A1    Feb. 5, 2015

(30) Foreign Application Priority Data

Mar. 22, 2012 (JP) ................. 2012-064826

(51) Int. Cl.
| | | |
|---|---|---|
| *C08F 4/52* | (2006.01) | |
| *C08F 4/48* | (2006.01) | |
| *C08F 4/56* | (2006.01) | |
| *C08F 220/18* | (2006.01) | |
| *C08F 220/14* | (2006.01) | |
| *C08F 220/20* | (2006.01) | |
| *C08F 222/10* | (2006.01) | |

(52) U.S. Cl.
CPC ... *C08F 4/52* (2013.01); *C08F 4/56* (2013.01); *C08F 220/18* (2013.01); *C08F 2222/1013* (2013.01); *C08F 4/48* (2013.01); *C08F 220/14* (2013.01)

(58) Field of Classification Search
CPC ........ C08F 4/52; C08F 220/14; C08F 220/20; C08F 2222/1013
USPC ....................................... 526/177, 323.2, 173
See application file for complete search history.

(56) References Cited

U.S. PATENT DOCUMENTS

| | | | |
|---|---|---|---|
| 6,555,637 B1 * | 4/2003 | Hamada et al. | ............... 526/186 |
| 8,119,749 B2 * | 2/2012 | Hamada et al. | ............... 526/177 |
| 2002/0032290 A1 * | 3/2002 | Uchiumi et al. | ............... 526/177 |
| 2008/0140037 A1 | 6/2008 | Newman | |

FOREIGN PATENT DOCUMENTS

| | | |
|---|---|---|
| JP | 2004 35728 | 2/2004 |
| JP | 2004 91613 | 3/2004 |
| JP | 2008 522003 | 6/2008 |

OTHER PUBLICATIONS

Hatada, K., et al., "Featured Article Structurally controlled polymerizations of methacrylates and acrylates", Polymerinternational, vol. 49, pp. 11-47 (2000).
International Search Report Issued Jun. 18, 2013 in PCT/JP13/056958 Filed Mar. 13, 2013.

* cited by examiner

*Primary Examiner* — Fred M Teskin
(74) *Attorney, Agent, or Firm* — Oblon, McClelland, Maier & Neustadt, L.L.P.

(57) ABSTRACT

A method for producing a (meth)acrylate copolymer via anionic polymerization of a mixture of a di(meth)acrylate and an alkyl (meth)acrylate in the presence of an organolithium compound, a tertiary organoaluminum compound, and at least one Lewis base selected from ethers and tertiary polyamines. The (meth)acrylate copolymer produced has a (meth)acryloyl groups in a side chain.

10 Claims, No Drawings

METHOD FOR PRODUCING (METH)ACRYLATE COPOLYMER

This application is a 371 of PCT/JP2013/056958, filed Mar. 13, 2013. Priority to Japanese patent application 2012-064826, filed Mar. 22, 2012, is claimed.

TECHNICAL FIELD

The present invention relates to a method for producing a (meth)acrylate copolymer. A (meth)acrylate copolymer produced using a method according to the present invention is useful as a component of a photocurable resin composition, for example.

BACKGROUND ART

It is known that photocurable resin compositions are cured when irradiated with ultraviolet light or an electron beam. Photocurable resin compositions have found use as bonding agents, adhesives, paints, and coating materials in electrical, electronic, and optical fields. Examples of components of photocurable resin compositions include monomers, oligomers, and polymers having at least one polymerizable functional group.

For example, it is known that a polymer having a plurality of methacryloyl groups as polymerizable functional groups in its side chains can be produced by performing anionic polymerization of an asymmetrical dimethacrylate represented by the following formula in toluene in the presence of t-butyllithium and methylaluminum bis(2,6-di-t-butylphenoxide) (see Non-patent Literature 1).

[Chem. 1]

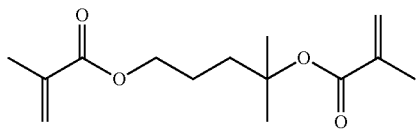

CITATION LIST

Non Patent Literature

NPL 1: Polymer International, vol. 49, pp. 11-47 (2000)

SUMMARY OF INVENTION

Technical Problem

However, the anionic polymerization in the production method described in Non-patent Literature 1 must be performed at a temperature as low as −60° C. in order to prevent polymerization of the methacryloyl groups in the side chains during the anionic polymerization. Thus, there is room for improvement from the industrial point of view. Accordingly, it is an object of the present invention to provide an industrially advantageous method for producing a (meth)acrylate copolymer that has at least one polymerizable functional group in its side chains and can be cured when irradiated with ultraviolet light or an electron beam.

Solution to Problem

The object can be achieved by providing the following in accordance with the present invention.

[1] A method for producing a (meth)acrylate copolymer (X) (hereinafter referred to as a copolymer (X)), including anionic polymerization of a mixture of a di(meth)acrylate (1) represented by the following general formula (1) (hereinafter referred to as a "di(meth)acrylate (1)") and an alkyl (meth)acrylate (2) represented by the following general formula (2) (hereinafter referred to as an "alkyl (meth)acrylate (2)") in the presence of an organolithium compound (L), a tertiary organoaluminum compound (A) having a chemical structure represented by the following general formula (3) in its molecules (hereinafter referred to as an aluminum compound (A)), and at least one Lewis base (B) selected from the group consisting of ethers and tertiary polyamines; and

[Chem. 2]

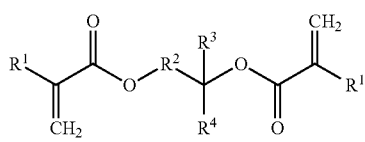

(wherein $R^1$ denotes a hydrogen atom or a methyl group, $R^2$ denotes a linear alkylene group having 1 to 5 carbon atoms, and $R^3$ and $R^4$ each independently denote a hydrocarbon group having 1 to 6 carbon atoms)

[Chem. 3]

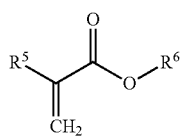

(wherein $R^5$ denotes a hydrogen atom or a methyl group, and $R^6$ denotes an alkyl group having 1 to 6 carbon atoms)

[Chem. 4]

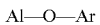

(wherein Ar denotes an aromatic ring)

[2] the method for producing a copolymer (X) according to [1], wherein the molar ratio of the di(meth)acrylate (1) to the alkyl (meth)acrylate (2) in the mixture ranges from 5:95 to 90:10.

Advantageous Effects of Invention

A production method according to the present invention can be used to industrially advantageously produce a copolymer (X) that is useful as a component of a photocurable resin composition.

DESCRIPTION OF EMBODIMENTS

The present invention will be described in detail below.
In a production method according to the present invention, a mixture of a di(meth)acrylate (1) and an alkyl (meth)acrylate (2) is subjected to anionic polymerization in the presence of an organolithium compound (L), an aluminum compound (A), and a Lewis base (B). In the di(meth)acrylate (1), the (meth)acryloyl group bonded to $R^2$ is selectively polymerized, whereas the (meth)acryloyl group bonded to the carbon atom bonded to $R^3$ and $R^4$ is prevented from polymerization and remains in the side chains of the copolymer (X). Thus, the copolymer (X) can be cured when irradiated with ultraviolet light or an electron beam.

Examples of the linear alkylene group having 1 to 5 carbon atoms denoted by $R^2$ include a methylene group, ethylene group, trimethylene group, tetramethylene group, and pentamethylene group. A methylene group or an ethylene group is preferred.

Examples of the hydrocarbon group having 1 to 6 carbon atoms each independently denoted by $R^3$ and $R^4$ include alkyl groups, such as a methyl group, ethyl group, n-propyl group, isopropyl group, n-butyl group, isobutyl group, sec-butyl group, t-butyl group, 2-methylbutyl group, 3-methylbutyl group, 2-ethylbutyl group, 3-ethylbutyl group, 2,2-dimethylbutyl group, 2,3-dimethylbutyl group, n-pentyl group, neopentyl group, n-hexyl group, 2-methylpentyl group, and 3-methylpentyl group; cycloalkyl groups, such as a cyclopropyl group, cyclobutyl group, cyclopentyl group, and cyclohexyl group; and a phenyl group. Among these, a methyl group or an ethyl group is preferred in order to increase the photocuring rate of the copolymer (X).

$R^5$ denotes a hydrogen atom or a methyl group. It is desirable that $R^5$ be the same atom or functional group as $R^1$.

Examples of the alkyl group having 1 to 6 carbon atoms denoted by $R^6$ include a methyl group, ethyl group, n-propyl group, isopropyl group, n-butyl group, isobutyl group, sec-butyl group, t-butyl group, 2-methylbutyl group, 3-methylbutyl group, 2-ethylbutyl group, 3-ethylbutyl group, 2,2-dimethylbutyl group, 2,3-dimethylbutyl group, n-pentyl group, neopentyl group, n-hexyl group, 2-methylpentyl group, and 3-methylpentyl group. Among these, a methyl group or an ethyl group is preferred.

The alkyl group having 1 to 6 carbon atoms denoted by $R^3$ and $R^4$ and the alkyl group having 1 to 6 carbon atoms denoted by $R^6$ may have a substituent. The substituent may be any substituent that does not adversely affect a production method according to the present invention, for example, an alkoxy group, such as a methoxy group, ethoxy group, isopropoxy group, or t-butoxy group; or a halogen atom, such as a chlorine atom or a bromine atom.

In a production method according to the present invention, the molar ratio of the di(meth)acrylate (1) to the alkyl (meth)acrylate (2) in the mixture subjected to the anionic polymerization preferably ranges from 5:95 to 90:10, more preferably 10:90 to 80:20, still more preferably 20:80 to 70:30, in order to improve the rate of polymerization and the photocurability of the copolymer (X).

In a production method according to the present invention, in addition to the di(meth)acrylate (1) and the alkyl (meth) acrylate (2), another monomer may be subjected to anionic polymerization without adversely affecting the production method according to the present invention. The other monomer may be any anionic polymerizable monomer and may be mixed with the mixture or may be added to the polymerization system. Examples of the other monomer include aromatic vinyl compounds, such as styrene and α-methylstyrene; and conjugated dienes, such as butadiene and isoprene. The amount of the other monomer to be used is not particularly limited and generally ranges from 0.05 to 2 times the total mass of the di(meth)acrylate (1) and the alkyl (meth) acrylate (2) in the mixture, preferably once or less the total mass of the di(meth)acrylate (1) and the alkyl (meth)acrylate (2) in terms of the photocurability of the copolymer (X).

The monomers (the di(meth)acrylate (1), the alkyl (meth) acrylate (2), and another optional monomer as described above) for use in a production method according to the present invention are preferably dried in advance in an inert gas atmosphere in order to facilitate the polymerization. A dehydrating agent or a drying agent, such as calcium hydride, a molecular sieve, or activated alumina, is preferably used in the drying.

The organolithium compound (L) used in a method according to the present invention acts as an anionic polymerization initiator. Examples of the organolithium compound (L) include t-butyllithium, 1,1-dimethylpropyllithium, 1,1-diphenylhexyllithium, 1,1-diphenyl-3-methylpentyllithium, ethyl α-lithioisobutyrate, butyl α-lithioisobutyrate, methyl α-lithioisobutyrate, isopropyllithium, sec-butyllithium, 1-methylbutyllithium, 2-ethylpropyllithium, 1-methylpentyllithium, cyclohexyllithium, diphenylmethyllithium, α-methylbenzyllithium, methyllithium, n-propyllithium, n-butyllithium, and n-pentyllithium. Among these, in terms of availability and anionic polymerization initiating ability, the organolithium compound (L) is preferably an organolithium compound having 3 to 40 carbon atoms and having a chemical structure containing a secondary carbon atom as an anion center, for example, isopropyllithium, sec-butyllithium, 1-methylbutyllithium, 1-methylpentyllithium, cyclohexyllithium, diphenylmethyllithium, or α-methylbenzyllithium, particularly preferably sec-butyllithium. These organolithium compounds (L) may be used alone or in combination.

The amount of the organolithium compound (L) preferably ranges from 0.0001 to 0.2 times the total moles of the monomers (the di(meth)acrylate (1), the alkyl (meth)acrylate (2), and another optional monomer) in the mixture in order to smoothly produce the copolymer (X).

The aluminum compound (A) used in a production method according to the present invention can be appropriately selected in a manner that depends on the type of monomers used (the di(meth)acrylate (1), the alkyl (meth)acrylate (2), and another optional monomer). In order to improve the rate of polymerization, the polymerization initiation efficiency, and the stability (living ability) of a polymerizable terminal anion, the aluminum compound (A) is preferably an organoaluminum compound represented by the following general formula (A-1) (hereinafter referred to as an aluminum compound (A-1)) or an organoaluminum compound represented by the following general formula (A-2) (hereinafter referred to as an aluminum compound (A-2)), more preferably the aluminum compound (A-1).

[Chem. 5]

$$AlR^7(R^8)(R^9) \tag{A-1}$$

(wherein $R^7$ denotes a monovalent saturated hydrocarbon group, monovalent aromatic hydrocarbon group, alkoxy group, aryloxy group, or N,N-disubstituted amino group, and $R^8$ and $R^9$ each independently denote an aryloxy group or together form an arylenedioxy group)

[Chem. 6]

$$AlR^{10}(R^{11})(R^{12}) \tag{A-2}$$

(wherein $R^{10}$ denotes an aryloxy group, and $R^{11}$ and $R^{12}$ each independently denote a monovalent saturated hydrocarbon group, monovalent aromatic hydrocarbon group, alkoxy group, or N,N-disubstituted amino group)

Examples of the aryloxy group denoted by $R^7$, $R^8$, $R^9$, and $R^{10}$ include a phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 1-naphthoxy group, 2-naphthoxy group, 9-phenanthryloxy group, 1-pyrenyloxy group, and 7-methoxy-2-naphthoxy group.

Examples of the arylenedioxy group formed by $R^8$ and $R^9$ include 2,2'-biphenol, 2,2'-methylenebisphenol, 2,2'-methylenebis(4-methyl-6-t-butylphenol), (R)-(+)-1,1'-bi-2-naphthol, and (S)-(−)-1,1'-bi-2-naphthol, from each of which hydrogen atoms of two phenolic hydroxy groups are eliminated.

The aryloxy group and arylenedioxy group may have one or more substituents. Examples of the substituent include alkoxy groups, such as a methoxy group, ethoxy group, isopropoxy group, and t-butoxy group; and halogen atoms, such as chlorine and bromine.

Examples of the monovalent saturated hydrocarbon group denoted by $R^7$, $R^{11}$, and $R^{12}$ include alkyl groups, such as a methyl group, ethyl group, n-propyl group, isopropyl group, n-butyl group, isobutyl group, sec-butyl group, t-butyl group, 2-methylbutyl group, 3-methylbutyl group, n-octyl group, and 2-ethylhexyl group; and cycloalkyl groups, such as a cyclohexyl group. Examples of the aromatic hydrocarbon group denoted by $R^7$, $R^{11}$, and $R^{12}$ include aryl groups, such as a phenyl group; and aralkyl groups, such as a benzyl group. Examples of the alkoxy group denoted by $R^7$, $R^{11}$, and $R^{12}$ include a methoxy group, ethoxy group, isopropoxy group, and t-butoxy group. Examples of the N,N-disubstituted amino group denoted by $R^7$, $R^{11}$, and $R^{12}$ include dialkylamino groups, such as a dimethylamino group, diethylamino group, and diisopropylamino group; and a bis(trimethylsilyl) amino group. The functional groups denoted by $R^7$, $R^{11}$, and $R^{12}$ may have a substituent, for example, an alkoxy group, such as a methoxy group, ethoxy group, isopropoxy group, or t-butoxy group; or a halogen atom, such as chlorine or bromine.

Examples of the aluminum compound (A-1) include ethylbis(2,6-di-t-butyl-4-methylphenoxy)aluminum, ethylbis(2,6-di-t-butylphenoxy)aluminum, ethyl[2,2'-methylenebis(4-methyl-6-t-butylphenoxy)]aluminum, isobutylbis(2,6-di-t-butyl-4-methylphenoxy)aluminum, isobutylbis(2,6-di-t-butylphenoxy)aluminum, isobutyl[2,2'-methylenebis(4-methyl-6-t-butylphenoxy)]aluminum, n-octylbis(2,6-di-t-butyl-4-methylphenoxy)aluminum, n-octylbis(2,6-di-t-butylphenoxy)aluminum, n-octyl[2,2'-methylenebis(4-methyl-6-t-butylphenoxy)]aluminum, methoxybis(2,6-di-t-butyl-4-methylphenoxy)aluminum, methoxybis(2,6-di-t-butylphenoxy)aluminum, methoxy[2,2'-methylenebis(4-methyl-6-t-butylphenoxy)]aluminum, ethoxybis(2,6-di-t-butyl-4-methylphenoxy)aluminum, ethoxybis(2,6-di-t-butylphenoxy)aluminum, ethoxy[2,2'-methylenebis(4-methyl-6-t-butylphenoxy)]aluminum, isopropoxybis(2,6-di-t-butyl-4-methylphenoxy)aluminum, isopropoxybis(2,6-di-t-butylphenoxy)aluminum, isopropoxy[2,2'-methylenebis(4-methyl-6-t-butylphenoxy)]aluminum, t-butoxybis(2,6-di-t-butyl-4-methylphenoxy)aluminum, t-butoxybis(2,6-di-t-butylphenoxy)aluminum, t-butoxy[2,2'-methylenebis(4-methyl-6-t-butylphenoxy)]aluminum, tris(2,6-di-t-butyl-4-methylphenoxy)aluminum, and tris(2,6-diphenylphenoxy)aluminum. Among these, in terms of the polymerization initiation efficiency, the living ability of a polymerizable terminal anion, availability, and handleability, the aluminum compound (A-1) is preferably isobutylbis(2,6-di-t-butyl-4-methylphenoxy)aluminum, isobutylbis(2,6-di-t-butylphenoxy)aluminum, or isobutyl[2,2'-methylenebis(4-methyl-6-t-butylphenoxy)]aluminum.

Examples of the aluminum compound (A-2) include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum, and di-n-octyl(2,6-di-t-butylphenoxy)aluminum. These aluminum compounds (A) may be used alone or in combination.

The aluminum compound (A) can be produced using a known method. For example, a 0.6 mol/l toluene solution of an aluminum compound (A-1), isobutylbis(2,6-di-t-butyl-4-methylphenoxy)aluminum, can be produced by adding 25 ml of dry toluene, which is dried with sodium and is then distilled in an argon atmosphere, and 11 g of 2,6-di-t-butyl-4-methylphenol to a 100-ml flask purged with argon, dissolving the 2,6-di-t-butyl-4-methylphenol in the dry toluene at room temperature while stirring, adding 6.8 ml of triisobutylaluminum to the resulting solution, and stirring the solution at 80° C. for approximately 18 hours.

The amount of the aluminum compound (A) to be used can be appropriately determined in a manner that depends on the type of organic solvent and the anionic polymerization conditions. In order to improve the stability of the anionic polymerization and selectively polymerize the (meth)acryloyl group to which $R^2$ of the di(meth)acrylate (1) is bonded, the amount of the aluminum compound (A) to be used preferably ranges from 1.0 to 10.0 mol, more preferably 1.2 to 6.0 mol, still more preferably 2.0 to 3.5 mol, still more preferably 2.2 to 3.0 mol, per mole of the organolithium compound (L).

The Lewis base (B) used in a production method according to the present invention is selected from the group consisting of ethers and tertiary polyamines. The ethers may be compounds having an intramolecular ether bond and are preferably cyclic ethers having two or more intramolecular ether bonds or acyclic ethers having one or more intramolecular ether bonds in order to improve the polymerization initiation efficiency and the living ability of a polymerizable terminal anion. Examples of the cyclic ethers having two or more intramolecular ether bonds include crown ethers, such as 12-crown-4, 15-crown-5, and 18-crown-6. Examples of the acyclic ethers having one or more intramolecular ether bonds include acyclic monoethers, such as dimethyl ether, diethyl ether, diisopropyl ether, dibutyl ether, and anisole; acyclic diethers, such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diisopropoxypropane, 1,2-dibutoxypropane, 1,2-diphenoxypropane, 1,3-dimethoxypropane, 1,3-diethoxypropane, 1,3-diisopropoxypropane, 1,3-dibutoxypropane, 1,3-diphenoxypropane, 1,4-dimethoxybutane, 1,4-diethoxybutane, 1,4-diisopropoxybutane, 1,4-dibutoxybutane, and 1,4-diphenoxybutane; and acyclic polyethers, such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether, and tetrabutylene glycol diethyl ether. Among these, in order to prevent side reactions and improve availability, the acyclic ethers are preferably acyclic ethers having one or two intramolecular ether bonds, more preferably diethyl ether or 1,2-dimethoxyethane.

The tertiary polyamines that can be used as the Lewis base (B) in the present specification are compounds having two or more tertiary amine structures in their molecules. Examples of the tertiary polyamines include chain polyamines, such as N,N,N',N'-tetramethylethylenediamine, N,N,N',N'-tetraethylethylenediamine, N,N,N',N'',N''-pentamethyldiethylenetriamine, 1,1,4,7,10,10-hexamethyltriethylenetetramine, and tris[2-(dimethylamino)ethyl]amine; non-aromatic heterocyclic compounds, such as 1,3,5-trimethylhexahydro-1,3,5-triazine, 1,4,7-trimethyl-1,4,7-triazacyclononane, and 1,4,7,10,13,16-hexamethyl-1,4,7,10,13,16-hexaazacyclooctadecane; and aromatic heterocyclic compounds, such as 2,2'-bipyridyl and 2,2':6',2''-terpyridine.

The Lewis base (B) may be a compound having one or more intramolecular ether bonds and one or more tertiary amine structures. Such a compound may be tris[2-(2-methoxyethoxy)ethyl]amine. These Lewis bases (B) may be used alone or in combination.

The amount of the Lewis base (B) used preferably ranges from 0.3 to 5 mol, more preferably 0.5 to 3 mol, still more preferably 0.8 to 2.5 mol, still more preferably 1.0 to 2.0 mol, per mole of the organolithium compound (L), in order to improve the polymerization initiation efficiency and the living ability of a polymerizable terminal anion. When the amount of the Lewis base (B) used is more than 5 mol per mole of the organolithium compound (L), this tends to be unfavorable for economic viability. When the amount of the Lewis base (B) used is less than 0.3 mol, this tends to result in low anionic polymerization initiation efficiency.

The amount of the Lewis base (B) used preferably ranges from 0.2 to 1.2 times, more preferably 0.3 to 1.0 times, the amount of the aluminum compound (A) used.

In order to control the temperature of the anionic polymerization and make the system uniform to facilitate the anionic polymerization, a production method according to the present invention is preferably performed in the presence of an organic solvent. In terms of safety, separation from water in water washing of the reaction liquid mixture after the anionic polymerization, and the ease with which the organic solvent can be recovered and reused, the organic solvent is preferably a hydrocarbon, such as toluene, xylene, cyclohexane, or methylcyclohexane; a halogenated hydrocarbon, such as chloroform, methylene chloride, or carbon tetrachloride; or an ester, such as dimethyl phthalate. These organic solvents may be used alone or in combination. In order to facilitate the anionic polymerization, the organic solvent is preferably dried and degassed in the presence of an inert gas in advance.

The amount of the organic solvent used can be appropriately changed in a manner that depends on the types of monomers used (the di(meth)acrylate (1), the alkyl (meth)acrylate (2), and another optional monomer), organolithium compound (L), aluminum compound (A), Lewis base (B), and organic solvent. In order to facilitate the anionic polymerization and improve separation and collection of the copolymer (X) and waste liquid treatment, the amount of the organic solvent used preferably ranges from 200 to 3000 parts by mass per 100 parts by mass of the mixture used.

A mixture of the organolithium compound (L), the aluminum compound (A), the Lewis base (B), the di(meth)acrylate (1), and the alkyl (meth)acrylate (2) may be added to the anionic polymerization reaction system using any method. The Lewis base (B) is preferably added so as to be brought into contact with the aluminum compound (A) before brought into contact with the organolithium compound (L). The aluminum compound (A) may be added to the anionic polymerization reaction system before or simultaneously with the addition of a mixture of the di(meth)acrylate (1) and the alkyl (meth)acrylate (2). In the case where the aluminum compound (A) is added to the anionic polymerization reaction system simultaneously with the mixture of the di(meth)acrylate (1) and the alkyl (meth)acrylate (2), the aluminum compound (A) may be mixed with the mixture before the addition.

In a production method according to the present invention, if necessary, another additive agent may be present in the anionic polymerization reaction system. Examples of the other additive agent include inorganic salts, such as lithium chloride; metal alkoxides, such as lithium methoxyethoxyethoxide and potassium t-butoxide; and tetraethylammonium chloride and tetraethylphosphonium bromide.

In a production method according to the present invention, the anionic polymerization is preferably performed at a temperature in the range of −30° C. to 25° C. An anionic polymerization temperature of less than −30° C. tends to result in a low rate of polymerization and low productivity. An anionic polymerization temperature of more than 25° C. tends to make it difficult to prevent polymerization of the (meth)acryloyl group bonded to the carbon atom of the di(meth)acrylate (1) to which $R^3$ and $R^4$ are bonded, thus resulting in low photocurability of the copolymer (X).

The anionic polymerization is preferably performed in an atmosphere of an inert gas, such as nitrogen, argon, or helium. The anionic polymerization is also preferably performed with sufficient stirring so as to make the anionic polymerization reaction system uniform.

Like known anionic polymerization processes, the anionic polymerization in a production method according to the present invention can be terminated by the addition of a polymerization terminator to the reaction mixture. The polymerization terminator may be a protic compound, such as methanol or a methanol solution of acetic acid or hydrochloric acid. The amount of polymerization terminator used preferably ranges from 1 to 100 mol per mole of the organolithium compound (L).

The copolymer (X) can be separated and collected from the reaction liquid mixture using a known method after the anionic polymerization. For example, the reaction liquid mixture may be poured into a poor solvent for the copolymer (X) to precipitate the copolymer (X), or the organic solvent is evaporated from the reaction liquid mixture to collect the copolymer (X).

The presence of a residual metal component derived from the organolithium compound (L) or the aluminum compound (A) in the copolymer (X) thus separated and collected may result in poor physical properties and transparency of the copolymer (X). Thus, such a residual metal component derived from the organolithium compound (L) or the aluminum compound (A) is preferably removed after the termination of the anionic polymerization. Such a metal component is effectively removed by washing the copolymer (X) with an aqueous acid or by adsorption using an adsorbent, such as an ion-exchange resin. Examples of the aqueous acid include aqueous hydrochloric acid, aqueous sulfuric acid, aqueous nitric acid, aqueous acetic acid, aqueous propionic acid, and aqueous citric acid.

A production method according to the present invention can be used to produce the copolymer (X) having any molecular weight. The copolymer (X) preferably has a number-average molecular weight in the range of 1,000 to 1,000,000 in terms of the handleability, fluidity, and mechanical properties of the copolymer (X). In general, the copolymer (X) produced using a production method according to the present invention has a narrow molecular weight distribution and can have a molecular weight distribution (Mw/Mn) of 1.5 or less.

The copolymer (X) produced using a production method according to the present invention is useful as a component of a photocurable resin composition for use in bonding agents, adhesives, paints, and coating materials, for example. For example, the photocurable resin composition applied forms a cured product when irradiated with ultraviolet light or an electron beam.

EXAMPLES

Although the present invention will be more specifically described in the following examples, the present invention is not limited to these examples.

In the examples, the raw materials were dried and purified using common procedures, were degassed using nitrogen, and were transferred and supplied in a nitrogen atmosphere.

[Consumption Rates and Side Chain Functional Group Reaction Rate of Di(meth)acrylate (1) and Alkyl (Meth)acrylate (2)]

The consumption rates of the di(meth)acrylate (1) and the alkyl (meth)acrylate (2) and the reaction rate of the side chain functional group of the di(meth)acrylate (1) after the anionic polymerization were determined by sampling 0.5 ml of the reaction solution, mixing the reaction solution with 0.5 ml of methanol, sampling 0.1 ml of the liquid mixture, dissolving the liquid mixture in 0.5 ml of deuteriochloroform, and subjecting the resulting solution to $^1$H-NMR measurement (ECX 400 (400 MHz) manufactured by JEOL Ltd., measurement temperature=25° C., number of scans=16, relaxation time=4 seconds).

The consumption rate $C_{11}$ (mol %) of the di(meth)acrylate (1) was calculated using the following equation:

$$C_{11}=100(1-I_{11}/I_{10})$$

wherein $I_{10}$ and $I_{11}$ denote the ratios of the integral of the proton peaks ascribed to the protons bonded to the carbon atom of $R^2$ of the di(meth)acrylate (1) adjacent to the oxygen atom to the integral of the proton peaks ascribed to the benzene ring of toluene used in the anionic polymerization at the beginning and end of the anionic polymerization, respectively.

The consumption rate $C_{21}$ (mol %) of the alkyl (meth) acrylate (2) was calculated using the following equation:

$$C_{21}=100[1-\{I_{21}\times(100-N\times I_{11}/I_{10})\}/\{I_{20}\times(100-N)\}]$$

wherein $I_{10}$ and $I_{11}$ denote the ratios described above; and $I_{20}$ and $I_{21}$ denote the ratios of the total of the integral of the proton peaks ascribed to the olefin of the (meth)acryloyl group to which $R^2$ of the di(meth)acrylate (1) is bonded and the integral of the proton peaks ascribed to the olefin of the methacryloyl group of the alkyl (meth)acrylate (2) to the integral of the proton peaks ascribed to the benzene ring of toluene used in the anionic polymerization at the beginning and end of the anionic polymerization, respectively. The proton peaks ascribed to the olefin of the (meth)acryloyl group to which $R^2$ of the di(meth)acrylate (1) is bonded overlap with the proton peaks ascribed to the olefin of the methacryloyl group of the alkyl (meth)acrylate (2). N denotes the mole fraction (mol %) of the di(meth)acrylate (1) based on the total amount of the di(meth)acrylate (1) and the alkyl (meth)acrylate (2) at the beginning of the reaction.

The overall consumption rate C (mol %) was calculated using the following formula from the consumption rates $C_{11}$ and $C_{21}$ calculated as described above and N.

$$C=\{C_{11}\times N+C_{21}\times(100-N)\}/100$$

In Comparative Examples, the consumption rate $C_{11}$ (mol %) of the di(meth)acrylate (1) was considered to be the consumption rate C (mol %).

The reaction rate $C_{31}$ (mol %) of the side chain functional group of the di(meth)acrylate (1) was calculated using the following equation:

$$C_{31}=100-100\times I_{31}/I_{30}$$

wherein $I_{30}$ and $I_{31}$ denote the ratios of the integral of the proton peaks ascribed to the olefin of the methacryloyl group bonded to the carbon atom to which $R^3$ and $R^4$ are bonded to the integral of the proton peaks ascribed to the benzene ring of toluene used in the anionic polymerization at the beginning and end of the anionic polymerization, respectively.

[Number-Average Molecular Weight and Molecular Weight Distribution]

The number-average molecular weight (Mn) and the molecular weight distribution (Mw/Mn) of the resulting copolymer (X) based on polystyrene standards were measured by gel permeation chromatography (GPC, HLC-8220 GPC (manufactured by Tosoh Corp.), column: TSK-gel SuperMultiporeHZ-M (manufactured by Tosoh Corp.) (column diameter=4.6 mm, column length=15 cm), measurement conditions: flow rate=0.35 ml/min, temperature=40° C., eluent=tetrahydrofuran).

Example 1

A 300-ml flask, the inside of which was dried and was purged with nitrogen, was charged with 100 ml of toluene, 0.20 ml (0.715 mmol) of a Lewis base (B) 1,1,4,7,10,10-hexamethyltriethylenetetramine, and 4.33 ml of a 0.450 mol/L toluene solution of an aluminum compound (A) isobutylbis(2,6-di-t-butyl-4-methylphenoxy)aluminum and was cooled to 0° C. 0.50 ml (0.65 mmol) of a 1.30 mol/L cyclohexane solution of an organolithium compound (L) sec-butyllithium was added to the flask. While vigorously stirring the liquid mixture in the flask, 4.47 ml of a mixture of 3.09 ml (13.0 mmol) of 1,1-dimethylpropane-1,3-diol dimethacrylate and 1.38 ml (13.0 mmol) of methyl methacrylate was added to the flask at 0° C. to initiate anionic polymerization. While stirring at 0° C., the reaction solution was initially yellow. While further stirring in a nitrogen atmosphere for 30 minutes, the reaction solution became substantially colorless. 120 minutes after the completion of the addition of the mixture, the reaction solution was sampled. The sample was subjected to measurements of the consumption rates C of 1,1-dimethylpropane-1,3-diol dimethacrylate and methyl methacrylate and the reaction rate of the side chain functional group of 1,1-dimethylpropane-1,3-diol dimethacrylate. 10.0 ml of methanol was added to the reaction solution to terminate the anionic polymerization. The resulting solution was poured into one liter of hexane. The resulting copolymer (X) was precipitated and collected.

At the end of the anionic polymerization, the consumption rates C of 1,1-dimethylpropane-1,3-diol dimethacrylate and methyl methacrylate were 100%, and the reaction rate of the side chain functional group of 1,1-dimethylpropane-1,3-diol dimethacrylate was 9.5%. The copolymer (X) had a Mn of 7,000 and a Mw/Mn of 1.19.

Example 2

A copolymer (X) was produced in the same manner as in Example 1 except that the amount of 0.450 mol/L toluene solution of isobutylbis(2,6-di-t-butyl-4-methylphenoxy)aluminum was changed to 7.22 ml and the amount of 1,1,4,7,10,10-hexamethyltriethylenetetramine was changed to 0.35 ml (1.30 mmol).

At the end of the anionic polymerization, the consumption rates C of 1,1-dimethylpropane-1,3-diol dimethacrylate and methyl methacrylate in the mixture were 100%, and the reaction rate of the side chain functional group of 1,1-dimethylpropane-1,3-diol dimethacrylate was 14.0%. The copolymer (X) had a Mn of 8,000 and a Mw/Mn of 1.14.

Example 3

A copolymer (X) was produced in the same manner as in Example 1 except that the amount of 0.450 mol/L toluene solution of isobutylbis(2,6-di-t-butyl-4-methylphenoxy)aluminum was changed to 3.18 ml, and the mixture was replaced with a mixture of 0.77 ml of 1,1-dimethylpropane-1,3-diol dimethacrylate and 1.04 ml of methyl methacrylate (1.81 ml in total).

At the end of the anionic polymerization, the consumption rates C of 1,1-dimethylpropane-1,3-diol dimethacrylate and methyl methacrylate were 100%, and the reaction rate of the side chain functional group of 1,1-dimethylpropane-1,3-diol dimethacrylate was 10.0%. The copolymer (X) had a Mn of 3,100 and a Mw/Mn of 1.14.

Example 4

A copolymer (X) was produced in the same manner as in Example 1 except that the internal temperature of the reactor before the addition of the mixture and the anionic polymerization temperature were 25° C., and the mixture was replaced with a mixture of 1.24 ml of 1,1-dimethylpropane-1,3-diol dimethacrylate and 2.21 ml of methyl methacrylate (3.45 ml in total).

At the end of the anionic polymerization, the consumption rates C of 1,1-dimethylpropane-1,3-diol dimethacrylate and methyl methacrylate were 100%, and the reaction rate of the side chain functional group of 1,1-dirnethylpropane-1,3-diol dimethacrylate was 17.0%. The copolymer (X) had a Mn of 6,300 and a Mw/Mn of 1.14.

Example 5

A copolymer (X) was produced in the same manner as in Example 3 except that the internal temperature of the reactor before the addition of the mixture and the anionic polymerization temperature were −22° C.

At the end of the anionic polymerization, the consumption rates C of 1,1-dimethylpropane-1,3-diol dimethacrylate and methyl methacrylate in the mixture were 100%, and the reaction rate of the side chain functional group of 1,1-dimethylpropane-1,3-diol dimethacrylate was 9.0%. The copolymer (X) had a Mn of 3,000 and a Mw/Mn of 1.10.

Example 6

A copolymer (X) was produced in the same manner as in Example 1 except that the amount of 0.450 mol/L toluene solution of isobutylbis(2,6-di-t-butyl-4-methylphenoxy)aluminum was changed to 5.78 ml.

At the end of the anionic polymerization, the consumption rates C of 1,1-dimethylpropane-1,3-diol dimethacrylate and methyl methacrylate in the mixture were 100%, and the reaction rate of the side chain functional group of 1,1-dimethylpropane-1,3-diol dimethacrylate was 11.3%. The copolymer (X) had a Mn of 7,100 and a Mw/Mn of 1.14.

Example 7

A copolymer (X) was produced in the same manner as in Example 1 except that the amount of 0.450 mol/L toluene solution of isobutylbis(2,6-di-t-butyl-4-methylphenoxy)aluminum was changed to 3.18 ml.

At the end of the anionic polymerization, the consumption rates C of 1,1-dimethylpropane-1,3-diol dimethacrylate and methyl methacrylate in the mixture were 100%, and the reaction rate of the side chain functional group of 1,1-dimethylpropane-1,3-diol dimethacrylate was 9.6%. The copolymer (X) had a Mn of 6,900 and a Mw/Mn of 1.18.

Example 8

Anionic polymerization was performed in the same manner as in Example 1 except that the amount of 0.450 mol/L toluene solution of isobutylbis(2,6-di-t-butyl-4-methylphenoxy)aluminum was changed to 2.17 ml. A sample was taken after 120 minutes. The monomer consumption rate was 92%, indicating that the monomers remained. Although the anionic polymerization was continued for another two hours, the monomer consumption rate was not significantly increased, and the anionic polymerization was considered to be almost terminated. Thus, the anionic polymerization was terminated five hours after the initiation of the anionic polymerization in the same manner as in Example 1, and a methacrylate polymer was obtained.

At the end of the anionic polymerization, the consumption rate C of 1,1-dimethylpropane-1,3-diol dimethacrylate in the mixture was 94%, and the reaction rate of the side chain functional group of 1,1-dimethylpropane-1,3-diol dimethacrylate was 5.9%. The methacrylate polymer had a Mn of 6,800 and a Mw/Mn of 1.14.

Comparative Example 1

Anionic polymerization was performed in the same manner as in Example 1 except that the mixture of 1,1-dimethylpropane-1,3-diol dimethacrylate and methyl methacrylate was replaced with 7.73 ml of 1,1-dimethylpropane-1,3-diol dimethacrylate alone. A sample was taken after 120 minutes. The monomer consumption rate was 51%, indicating that the monomers remained. Although the anionic polymerization was continued for another two hours, the monomer consumption rate was not significantly increased, and the anionic polymerization was considered to be almost terminated. Thus, the anionic polymerization was terminated five hours after the initiation of the anionic polymerization in the same manner as in Example 1, and a methacrylate polymer was obtained.

At the end of the anionic polymerization, the consumption rate C of 1,1-dimethylpropane-1,3-diol dimethacrylate was 53%, and the reaction rate of the side chain functional group was 3.3%. The methacrylate polymer had a Mn of 7,800 and a Mw/Mn of 1.16.

Comparative Example 2

Anionic polymerization was performed in the same manner as in Comparative Example 1 except that the amount of 1,1-dimethylpropane-1,3-diol dimethacrylate was 6.19 ml, and the internal temperature of the reactor before the addition of 1,1-dimethylpropane-1,3-diol dimethacrylate and the anionic polymerization temperature were −22° C. A sample was taken after 120 minutes. The monomer consumption rate was 72%, indicating that the monomers remained. Although the anionic polymerization was continued for another two hours, the monomer consumption rate was not significantly increased, and the anionic polymerization was considered to be almost terminated. Thus, the anionic polymerization was terminated five hours after the initiation of the anionic polymerization in the same manner as in Example 1, and a methacrylate polymer was obtained.

At the end of the anionic polymerization, the consumption rate C of 1,1-dimethylpropane-1,3-diol dimethacrylate was 74%, and the reaction rate of the side chain functional group was 0.9%. The methacrylate polymer had a Mn of 7,600 and a Mw/Mn of 1.08.

Table 1 shows the polymerization conditions and polymerization results of the examples and comparative examples. Examples 1 to 8 and Comparative Examples 1 and 2 show that copolymerization of the di(meth)acrylate (1) and the alkyl (meth)acrylate (2) resulted in a successful anionic polymerization even at a high temperature of 0° C. or 25° C., thus producing a copolymer having a narrow molecular weight distribution.

A comparison between Examples 1, 6, 7, and 8 shows that when the amount of aluminum compound (A) used was 2.2 mol or more per mole of the organolithium compound (L), the monomer consumption rate C was 100%, and when the amount of aluminum compound (A) used was 3.0 mol or less per mole of the organolithium compound (L), the reaction rate of the side chain functional group of the di(meth)acrylate (1) was low.

TABLE 1

| | Anionic polymerization conditions | | | | | Anionic polymerization results | | | Side chain functional group |
|---|---|---|---|---|---|---|---|---|---|
| | Organoaluminum compound (A): mmol | Lewis base (B): mmol | Di(meth)acrylate (1) IPGDMA mmol | Alkyl (meth)acrylate (2) MMA mmol | Temperature: °C. | Consumption Rate C: % | Mn | Mw/Mn | reaction rate of di(meth)acrylate (1) $C_{31}$: % |
| Example 1 | 1.95 | 0.715 | 13.0 | 13.0 | 0 | 100 | 7000 | 1.19 | 9.5 |
| Example 2 | 3.25 | 1.30 | 13.0 | 13.0 | 0 | 100 | 8000 | 1.14 | 14.0 |
| Example 3 | 1.43 | 0.715 | 3.25 | 9.75 | 0 | 100 | 3100 | 1.14 | 10.0 |
| Example 4 | 1.95 | 0.715 | 5.20 | 20.8 | 25 | 100 | 6300 | 1.14 | 17.0 |
| Example 5 | 1.95 | 0.715 | 3.25 | 9.75 | −22 | 100 | 3000 | 1.10 | 9.0 |
| Example 6 | 2.60 | 0.715 | 13.0 | 13.0 | 0 | 100 | 7100 | 1.14 | 11.3 |
| Example 7 | 1.43 | 0.715 | 13.0 | 13.0 | 0 | 100 | 6900 | 1.18 | 9.6 |
| Example 8 | 0.975 | 0.715 | 13.0 | 13.0 | 0 | 94 | 6800 | 1.14 | 5.9 |
| Comparative example 1 | 1.95 | 0.715 | 32.5 | 0 | 0 | 53 | 7800 | 1.16 | 3.3 |
| Comparative example 2 | 1.95 | 0.715 | 26.0 | 0 | −22 | 74 | 7600 | 1.08 | 0.9 |

IPGDMA: 1,1-dimethylpropane-1,3-diol dimethacrylate (isoprene glycol dimethacrylate)
MMA: methyl methacrylate

The invention claimed is:

1. A method for producing a (meth)acrylate copolymer, comprising:
    anionic polymerization of a mixture of a di(meth)acrylate represented by formula (1) and an alkyl (meth)acrylate represented by formula (2) in the presence of an organolithium compound, a tertiary organoaluminum compound comprising a chemical structure represented by formula (3) in its molecule, and at least one Lewis base selected from the group consisting of ethers and tertiary polyamines

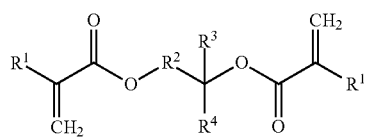
(1)

wherein $R^1$ denotes a hydrogen atom or a methyl group, $R^2$ denotes a linear alkylene group having 1 to 5 carbon atoms, and $R^3$ and $R^4$ each independently denote a hydrocarbon group having 1 to 6 carbon atoms $$R^5 \underset{CH_2}{\overset{O}{\diagdown}} O - R^6 \quad (2)$$

wherein $R^5$ denotes a hydrogen atom or a methyl group, and $R^6$ denotes an alkyl group having 1 to 6 carbon atoms $$Al-O-Ar \quad (3)$$

wherein Ar denotes an aromatic ring
wherein said (meth)acrylate copolymer produced by said method has (meth)acryloyl groups in a side chain thereof.

2. The method for producing a (meth)acrylate copolymer according to claim 1, wherein the molar ratio of the di(meth)acrylate represented by formula (1) to the alkyl (meth)acrylate represented by formula (2) in the mixture ranges from 5:95 to 90:10.

3. The method for producing a (meth)acrylate copolymer according to claim 1, wherein the anionic polymerization is performed at a temperature of −30° C. to 25° C.

4. The method for producing a (meth)acrylate copolymer according to claim 2, wherein the anionic polymerization is performed at a temperature of −30° C. to 25° C.

5. The method for producing a (meth)acrylate copolymer according to claim 1, wherein the molar ratio of tertiary organoaluminum compound to organolithium compound is 2.2-3.0, and wherein the consumption rate of said di(meth)acrylate represented by formula (1) and said alkyl (meth)acrylate represented by formula (2) in said anionic polymerization is 100%.

6. The method for producing a (meth)acrylate copolymer according to claim 1, wherein the anionic polymerization is performed at a temperature of 0° C. to 25° C.

7. The method for producing a (meth)acrylate copolymer according to claim 2, wherein the anionic polymerization is performed at a temperature of 0° C. to 25° C.

8. The method for producing a (meth)acrylate copolymer according to claim 5, wherein the anionic polymerization is performed at a temperature of 0° C. to 25° C.

9. The method for producing a (meth)acrylate copolymer according to claim 1, wherein the reaction rate of said (meth)acryloyl group in said side chain of said (meth)acrylate copolymer is 17.0 or less.

10. The method for producing a (meth)acrylate copolymer according to claim 5, wherein the reaction rate of said (meth)acryloyl group in said side chain of said (meth)acrylate copolymer is 17.0 or less.

* * * * *